United States Patent
Sheldon et al.

(10) Patent No.: US 7,061,871 B2
(45) Date of Patent: Jun. 13, 2006

(54) SYSTEM AND METHOD FOR IDENTIFYING ERRORS IN A VIDEO CONFERENCE CONDUCTED ON A PACKET-BASED NETWORK

(75) Inventors: Robert D. Sheldon, Austin, TX (US); Benton B. Maples, Austin, TX (US); Terri J. Gott, Leander, TX (US)

(73) Assignee: Tandberg Telecom AS, Lysaker (NO)

( * ) Notice: Subject to any disclaimer, the term of this patent is extended or adjusted under 35 U.S.C. 154(b) by 1003 days.

(21) Appl. No.: 09/943,631

(22) Filed: Aug. 30, 2001

(65) Prior Publication Data

US 2003/0039216 A1 Feb. 27, 2003

Related U.S. Application Data

(60) Provisional application No. 60/309,135, filed on Jul. 31, 2001.

(51) Int. Cl.
*H04L 12/16* (2006.01)

(52) U.S. Cl. ............ 370/242; 370/252; 370/260; 379/158; 379/202.01

(58) Field of Classification Search ........ 370/259–263; 379/201.01, 202.01, 204.01, 203.01, 207.01, 379/207.02, 207.03
See application file for complete search history.

(56) References Cited

U.S. PATENT DOCUMENTS

| | | | |
|---|---|---|---|
| 6,104,705 A * | 8/2000 | Ismail et al. | 370/260 |
| 6,108,782 A * | 8/2000 | Fletcher et al. | 713/153 |
| 6,269,401 B1 * | 7/2001 | Fletcher et al. | 709/224 |
| 6,453,336 B1 * | 9/2002 | Beyda et al. | 709/204 |
| 6,529,475 B1 * | 3/2003 | Wan et al. | 370/231 |
| 6,697,341 B1 * | 2/2004 | Roy | 370/260 |
| 6,721,284 B1 * | 4/2004 | Mottishaw et al. | 370/255 |
| 6,775,247 B1 * | 8/2004 | Shaffer et al. | 370/260 |
| 6,826,708 B1 * | 11/2004 | Michalewicz | 714/4 |
| 6,831,899 B1 * | 12/2004 | Roy | 370/260 |

* cited by examiner

*Primary Examiner*—Hassan Kizou
*Assistant Examiner*—Jay P. Patel
(74) *Attorney, Agent, or Firm*—Oblon, Spivak, McClelland, Maier & Neustadt, P.C.

(57) ABSTRACT

A system and method for identifying errors in a video conference conducted on a network are disclosed. A central device includes a central agent that detects an error during a video conference conducted on a network between two or more endpoints. The central agent distributes a capture agent via the network to a remote device associated with a collision domain that contains one of the two or more endpoints. The capture agent collects a plurality of media packets associated with the video conference in a capture file located in a storage medium associated with the remote device until a timer expires. When the timer expires, the capture agent communicates the capture file to the central agent at the central device.

43 Claims, 2 Drawing Sheets

SYSTEM AND METHOD FOR IDENTIFYING ERRORS IN A VIDEO CONFERENCE CONDUCTED ON A PACKET-BASED NETWORK

CROSS REFERENCE TO RELATED APPLICATIONS

This application claims priority from U.S. Provisional Patent Application Ser. No. 60/309,135, filed Jul. 31, 2001, and entitled "System and Method for Identifying Errors in a Video Conference Conducted on a Network."

TECHNICAL FIELD OF THE INVENTION

This invention relates in general to video conferencing, and more particularly to a system and method for identifying errors in a video conference conducted on a packet-based network.

BACKGROUND OF THE INVENTION

Today, people can communicate with each other through a variety of methods. Meetings between two or more individuals located at physically distinct locations may be conducted on a telephone and through video conferences. Video conferencing allows individuals at remote locations to interact and exchange information through electronic means. A video conference typically includes full motion video presentations that are conducted across any number of communications networks and displayed on video conferencing systems located at the remote locations. The video conferencing systems generally include a camera and a microphone to capture the video and audio information at the particular location, a monitor that allows the participants at one location to view and hear the participants at the remote location and a computer device that processes the audio and video information that is transmitted and received by the endpoint.

Each video conference occurring over a particular network may be monitored by a system or network administrator. The administrator typically is not physically located near any of the endpoints participating the video conferences. The administrator may monitor the video conferences occurring on a particular network but has no way of remotely determining whether network factors, such as jitter, latency and throughput, are causing the decrease in quality of the audio and video streams in the conference. Therefore, it is practically impossible for the administrator to make a real-time determination whether the network factors are the root cause of the poor audio and/or video quality experienced by the users, or whether the network is operating beyond thresholds that would make poor audio and video quality a likely result.

Furthermore, video conferencing systems are typically distributed over large geographic areas and video conferences typically occur between two or more locations that are remote to the administrator. In order to diagnose some problems that may be related to the network, an administrator must travel to the remote locations or a skilled network professional must be located at each one of the remote sites. The administrator can then determine if latency, jitter and throughput are causing the decrease in quality in the audio and video streams.

SUMMARY OF THE INVENTION

Therefore a need has arisen for a system and method that automatically monitors a video conference conducted over a network and identifies problems in the network that cause errors during the video conference.

A further need exists for a system and method that provides real-time analysis of whether network parameters are the cause of poor audio and/or video quality in the video conference.

An additional need exists for a system and method that automatically distributes an agent via a network to the remote locations of a video conference and calculates the latency, jitter and throughput of a typical video conference for analysis by a system administrator.

In accordance with the present invention, a system and method is provided that substantially eliminates the disadvantages and problems associated with previously developed systems and methods for identifying errors in a video conference conducted on a network. A distributed agent collects media packets transmitted and received by one or more endpoints participating in a video conference and communicates the collected media packets to a central agent. The central agent analyzes the media packets to determine if network factors caused an error to occur in the video conference.

More specifically, a central agent at a central device remotely monitors a video conference between two or more participating endpoints. The central agent distributes a capture agent that examines individual packets to determine values for network parameters, such as jitter, latency, throughput and packet loss. The central agent distributes the capture agent at the request of a system administrator, at time intervals determined by the administrator, or based on conditions in the network that generate an alarm. The conditions that generate the alarm may be triggered by Simple Network Management Protocol (SNMP) or other suitable monitoring techniques that may be included in the central agent, or by external network management systems, according to thresholds defined by the administration.

When notified, the central agent distributes a capture agent to a remote device associated with a collision domain that contains one of the endpoints participating in the video conference. After distributing the capture agent, the central agent initiates a timer that controls how much information is collected during the video conference. For example, the timer could be set to expire after a predetermined amount of time or a predetermined number of packets are collected, or the timer could expire at the end of the video conference.

Once the timer has started, the capture agent monitors the video conference and collects media packets transmitted and received by the participating endpoints. The capture agent stores the media packets in a capture file located in a storage medium interfaced with the remote device. When the timer expires, the capture agent communicates the capture file from the remote device to the central device. The central agent reads the capture file and analyzes the collected media packets to determine what network parameter caused the error in the video conference. For instance, the media packets may include real-time protocol (RTP) and real-time control protocol (RTCP) packets. The central agent examines the time stamp on the collected media packets and the sequence number of the packets to determine the latency for the media packets and the amount of jitter present in the video conference.

After analyzing the media packets in the capture file, the central agent displays the results on a graphical user interface (GUI). The system administrator uses the results to determine if the network conditions caused the errors in the video conference. In an alternative embodiment, the central agent automatically sends an alarm to the system administrator if the measured values for latency, jitter and/or throughput exceed the thresholds defined by the administrator.

The present invention provides a number of important technical advantages. One important technical advantage of certain embodiments of the present invention includes a central agent that monitors traffic on a network and provides real-time analysis of errors that may occur during a video conference. Upon receiving notification, the central agent automatically distributes a capture agent to the endpoints participating in the video conference. The capture agent collects media packets transmitted and received by the endpoints and communicates the packets to the central agent to be decoded and analyzed. Thus, a system administrator can receive a report on problems that occur on the network and can correct those problems before the audio and/or video quality of the video conference degrades.

An additional technical advantage of certain embodiments of the present invention includes a central agent that provides passive collection of network information. A system administrator determines threshold values for various network parameters. When one of the threshold values is exceeded, the central agent receives an alarm and distributes a capture agent to the endpoints participating in a video conference. The capture agent is opened and executed by a remote device associated with the endpoints. Therefore, network traffic is not significantly increased because the central agent and the capture agent collect and analyze information from devices coupled to the network.

A further technical advantage of certain embodiments of the present invention includes a central agent that provides reports to a system administrator so that problems in a network may be corrected before an error occurs in a video conference. A central agent receives a file from a capture agent that includes multiple media packets from one video conference being conducted on the network. The central agent decodes the media packets and calculates specific network parameters, such as latency, jitter and throughput. The system administrator may use these parameters to analyze the network traffic and prevent the reported problems from affecting future video conferences.

Other technical advantages will be readily apparent to one skilled in the art from the following figures, descriptions, and claims.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein.

DETAILED DESCRIPTION OF THE INVENTION

Preferred embodiments of the present invention are illustrated in the figures, like numerals being used to refer to like and corresponding parts of the various drawings.

Video conferencing between two or more remote locations is becoming a popular way of allowing individuals to communicate with each other. Businesses often prefer the more personal communication available through a video conference when compared to a telephone conference, and also can save travel costs while having a personal presence among the parties that is not possible with a telephone conference. However, the audio and video quality of the video conferences may be degraded by problems in the network. For example, if latency or jitter exceed an acceptable threshold, glitches may occur in the video conference that cause the audio to be out of synch with the video or the video may freeze and lose part of the conference.

Currently, system administrators have no way of remotely identifying potential network errors related to latency, jitter and/or throughput in real-time. In one embodiment, the present invention allows real-time identification of the errors in a video conference by distributing a capture agent to the endpoints participating in the video conference when a network error is detected. The capture agent collects media packets from each participating endpoint and communicates them to a central agent when a timer set by the central agent expires. The central agent analyzes the media packets and displays the results on a graphical user interface (GUI) to allow the system administrator to determine if the network is the cause of the errors in the video conference.

Figure 1:
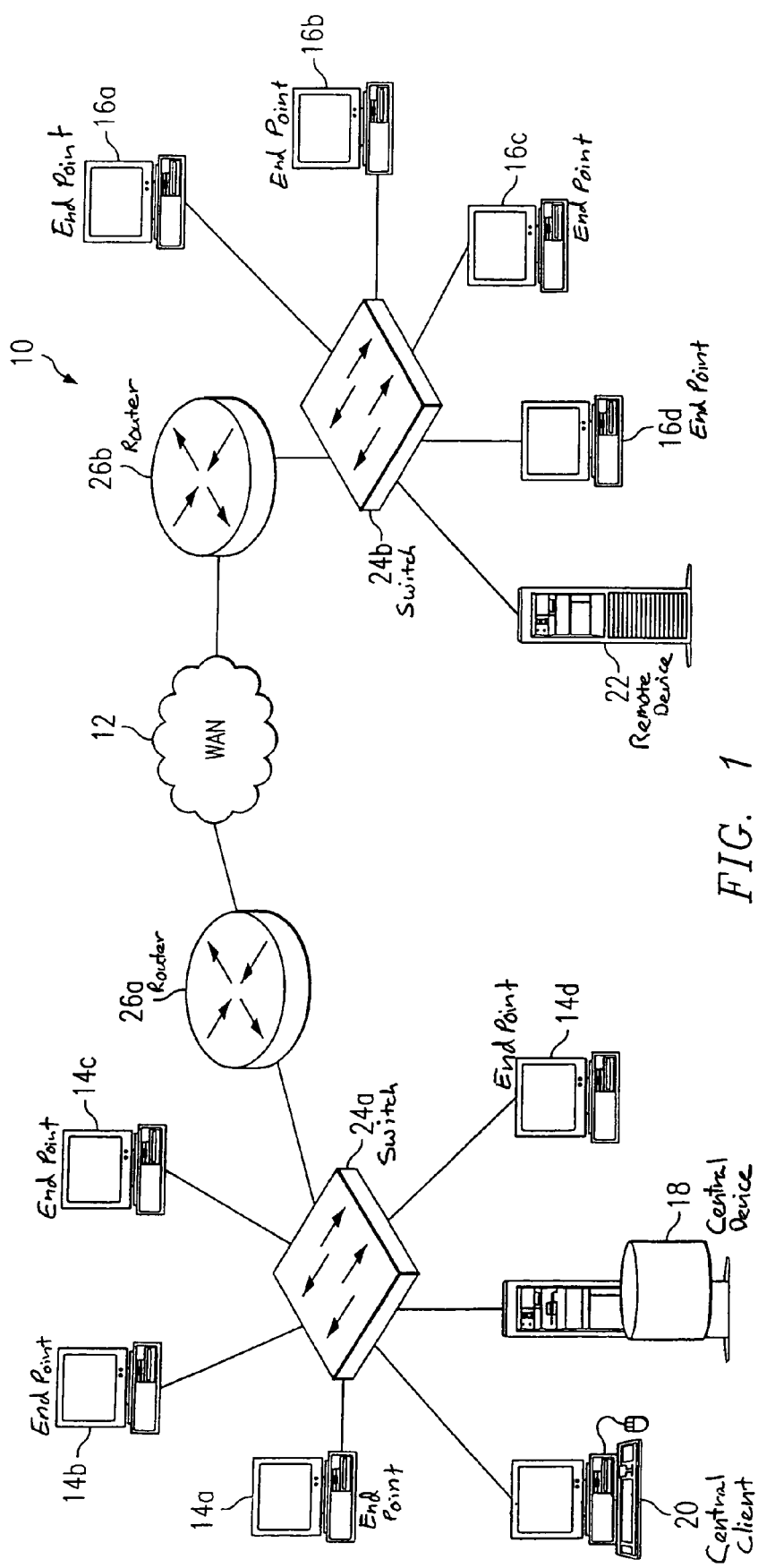
FIG. 1 illustrates a block diagram of a video conferencing system that identifies errors in a video conference conducted over a network between two or more endpoints.

FIG. 1 illustrates a block diagram of video conferencing system 10 for identifying errors during a video conference conducted over network 12. Although a specific network is illustrated in FIG. 1, the term "network" should be interpreted as generically defining any network capable of transmitting telecommunication signals, data and/or messages. In the illustrated embodiment, system 10 includes routers 26a and 26b (generally referred to as routers 26) coupled to network 12 and switches 24a and 24b (generally referred to as switches 24) coupled to routers 26. Endpoints 14a through 14d (generally referred to as endpoints 14) and endpoints 16a through 16d (generally referred to as endpoints 16) respectively couple to switches 24a and 24b. System 10 further includes central device 18 and central client 20 coupled to switch 24a and remote device 22 coupled to switch 24b. In one embodiment, central device 18 includes a central agent that distributes a capture agent to one or more of endpoints 14 and 16 and/or remote device 22 upon receiving notification that an error occurred in a video conference being conducted over network 12. The capture agent collects media packets transmitted and received by endpoints 14 and 16 during the video conference and communicates the media packets to the central agent for analysis when a timer expires or the affected video conference ends.

Network 12 may be a local area network (LAN), a wide area network (WAN), the Internet or other suitable network that transmits packets of voice, video, data and other information (generally referred to as media). In a particular embodiment, network 12 may be an Internet Protocol (IP) network. However, network 12 may be any type of network that allows transmission of audio and video telecommunication signals, as well as traditional data communications. Therefore, although subsequent description will primarily focus on IP communications, it should be understood that other appropriate methods of transmitting media over a network, such as a Frame Relay, Asynchronous Transfer Mode (ATM) or other packet-based networks, are also included within the scope of the present invention.

IP networks and other packet-based networks typically transmit media by placing the data in cells, packets, frames, or other portions of information (generally referred to as packets) and sending each packet individually to the selected destination. Unlike a circuit-switched network, such as Integrated Services Digital Network (ISDN), dedicated bandwidth is not required for the duration of a conference call over network 12. Instead, endpoints 14 and 16 may send packets across network 12 as network 12 becomes available for transmission. This feature makes bandwidth available for additional communications when endpoints 14 and 16 are not communicating media.

Endpoints 14 and 16 may be any type of video conferencing systems that provides real-time audio and video communication to users at remote locations. Endpoints 14 and 15 may have the capability to encapsulate a user's voice, the user's image and/or other content into data packets so that the content may be transmitted over network 12. Endpoints 14 and 16 may also have the capability to communicate video information over network 12 by using H.323 or any other suitable video communication protocol and audio information by using G.711, G.723, G.729 or other suitable audio coding protocols. In an alternative embodiment, endpoints 14 and 16 may, for example, include cordless or cellular telephones, personal digital assistants (PDAs), or other wireless devices. Also, endpoints 14 and 16 may include telephony software running on a computing device, traditional plain old telephone (POTS) devices, analog phones, digital phones, IP telephony devices, or other computing and/or communication devices that communicate media using analog and/or digital signals.

Routers 26 are linked to switches 24 and network 12 by any suitable physical transmission media and/or communications equipment. Routers 26 may represent communications equipment, including hardware and/or software, operable to receive, route and transmit packets of information. Routers 26 may include one or more interfaces through which the services provided by routers 26 may be accessed by other devices on networks 12. Routers 26 may also include an operating system that provides routing services through the implementation of various routing protocols, quality of service (QoS) services, and discovery services. Routers 26 further define the boundary of the broadcast domain associated with endpoints 14 and 16. The broadcast domain defines the portion of the network that switches 24 control.

In the illustrated embodiment, central device 18 couples to switches 24 and is located in one of the broadcast domains associated with endpoints 14 and 16. In an alternative embodiment, central device 18 may be located at any position in network 12. Central device 18 includes a central agent that monitors network 12 through standard network management techniques, such as Simple Network Management Protocol (SNMP), to determine if certain network parameters exceed a predefined threshold defined by a system administrator. The central agent may initiate distribution of the capture agent according to time intervals determined by the system administrator, on a request from the administrator, when a network threshold set by the administrator has been met or exceeded, or any other suitable technique for triggering the distribution of the capture agent during a video conference.

Once the capture agent has been distributed, it measures network parameters, such as latency, jitter, and throughput. Latency refers to the time between transmission of a media packet at endpoint 14a to reception of the media packet at endpoint 16b. Latency may be increased if traffic over network 12 increases. In one embodiment, the predetermined threshold may be approximately 250 milliseconds. Jitter is the variation in latency that results from media packets arriving at their destinations (e.g., endpoints 14a or 16b) at different times. These media packets may arrive in a different sequence and cause poor audio and video quality if the media packets are dropped. Endpoints 14a and 16b include buffers that store media packets for a specific length of time and assemble the media packets in the correct order. If the jitter exceeds the buffer storage time, the media packets will be dropped, and endpoints 14a and 16b may lose the ability to maintain synchronization between the audio stream and the video stream of the video conference and frames of the video conference may freeze. Throughput is the amount of data traffic that can be sent and received over network 12 in a given time interval. If the throughput drops below a certain time interval, the amount of audio and video information will decrease, which increases the amount of latency. Decreased throughput and increased latency may result in the degradation in quality of the audio and video information in the video conference.

If the central agent receives a distribution notice, the central agent distributes a capture agent to remote device 22 to collect media packets associated with the video conference being measured. The capture agent returns the collected media packets to the central agent at central device 18 to be decoded and analyzed. Results are displayed on central client 20 where the system administrator can determine how to correct the problems in the video conference. Central client 20 may be a workstation, desktop computer, server or any other computer system that includes a display or GUI that allows a user to view and manipulate data.

Remote device 22 includes processing resources and an associated storage medium (not expressly shown). The processing resources may be a controller, microprocessor, digital signal processor (DSP) or other suitable device that may execute the capture agent to collect media packets during the video conference. The storage medium may be integrated in or interfaced with remote device 22 and operates to store the collected media packets in a storage file for communication back to the central agent located on central device 18. Although FIG. 1 shows remote device 22 as being separate from endpoints 14 and 16 in FIG. 1, remote device 22 and endpoints 14 and 16 may each operate on one or more computers at one or more localized or distributed locations throughout network 12. In an alternative embodiment, remote device 22 may be located on one of the switch ports in switches 24 that have the capability to monitor the traffic for endpoints 14 and/or 16.

In operation, the processing resources located in remote device 22 execute the capture agent to collect media packets during the video conference. The processing resources store the collected packets in the capture file located in the storage medium. When a timer started by the central agent expires, the processing resources retrieve the capture file from the storage medium and communicate the file back to the central agent being executed on central device 18.

Figure 2:
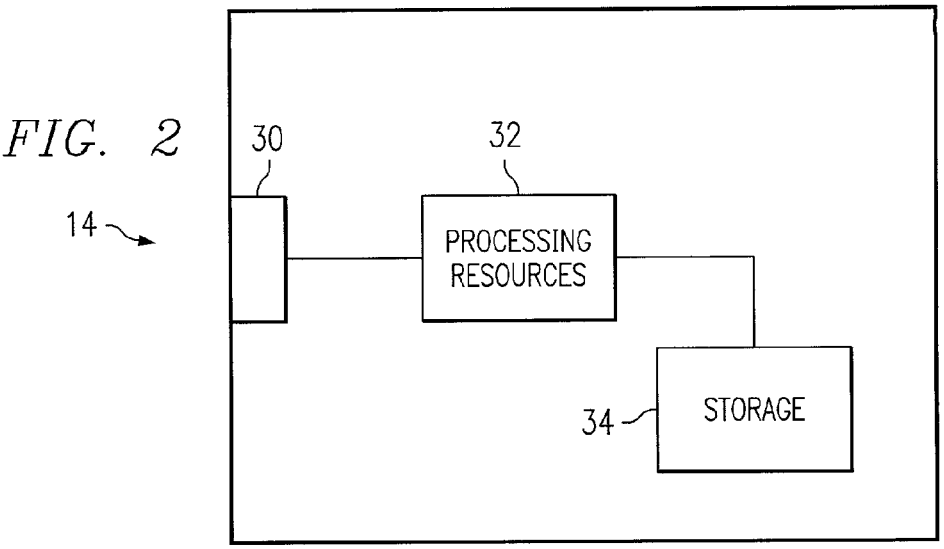
FIG. 2 illustrates a block diagram of an endpoint that identifies errors in the video conference conducted over the network.

FIG. 2 illustrates a block diagram of endpoints 14 and 16 that identify errors in a video conference conducted on network 12. Endpoints 14 and 16 may include network interface 30, processing resources 32 and storage medium 34. Network interface 30 operates to couple endpoints 14 and 16 to network 12 so that endpoints 14 and 16 may participate in a video conference. Processing resources 32 may be a controller, a microprocessor, a DSP, or any other suitable resource that executes an agent for monitoring a video conference, and collecting and analyzing media packets associated with the video conference. Storage medium 34 may be any type of storage device that is capable of storing information, such as media packets containing audio, video, and/or data information.

In operation, media packets associated with the video conference are transmitted and received through network interface 30. Processing resources 32 interface with network interface 30 and execute a capture agent that collects the transmitted and received media packets. While executing on processing resources 32, the capture agent communicates with storage medium 34 to store the collected media packets in a capture file. When the capture agent receives notification that a timer associated with the video conference has expired, processing resources 32 retrieve the capture file from storage medium 34 and communicates the file to a central agent via network interface 30. In an alternative embodiment, processing resources 32 retrieve the capture file, decode the collected media packets, and analyze the video, audio, and data information contained in the media packets. The results of the analysis may include the latency for the media packets communicated in the video conference, the jitter associated with the video conference, the number of packets dropped or lost during the video conference and the throughput of network 12. Processing resources 32 then send the results to the central agent via network interface 30.

Figure 3:
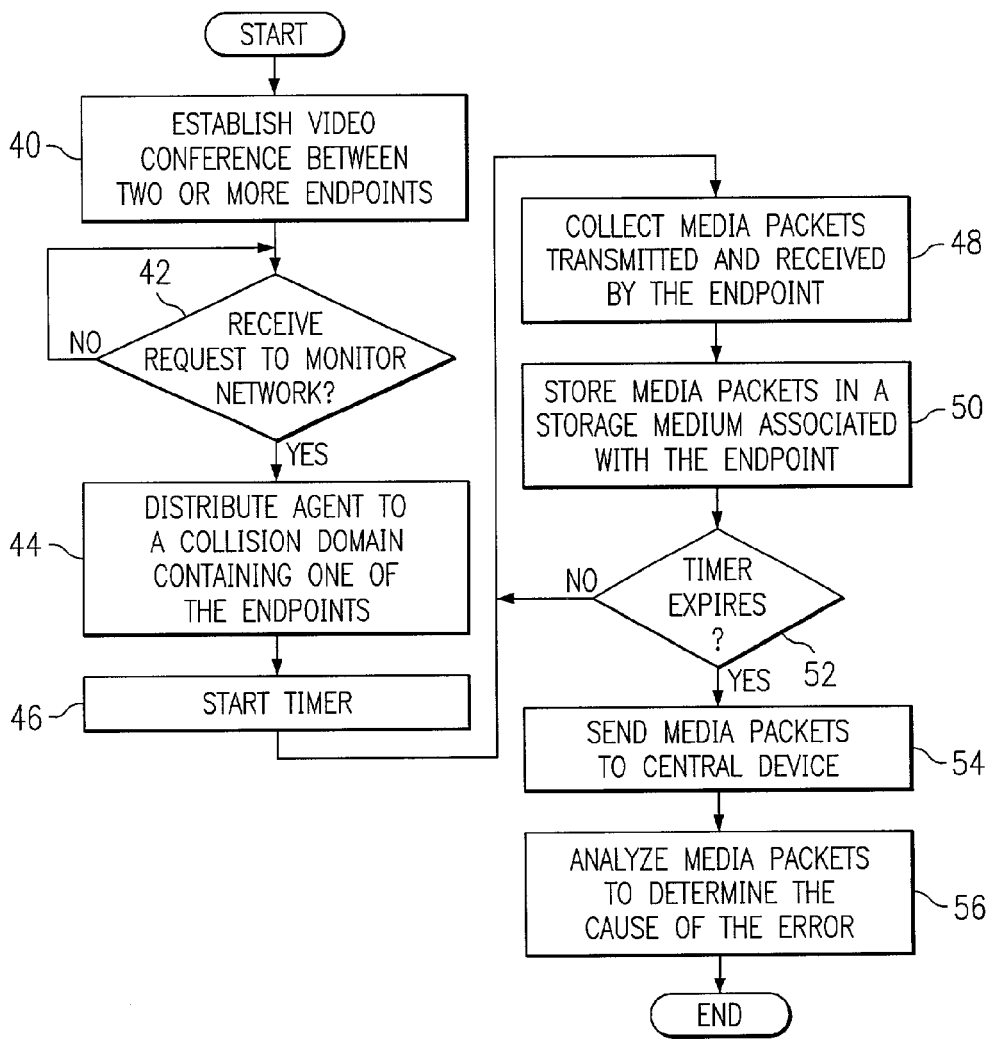
FIG. 3 illustrates a flowchart of a method for identifying errors in the video conference conducted over the network.

FIG. 3 illustrates flowchart for identifying errors in a video conference conducted on network 12. Generally, a central agent located on central device 18 monitors network 12 using standard network management techniques, such as SNMP, and determines when predefined thresholds have been met or exceeded. When the central agent receives notification of a potential network error or that a predefined time interval has elapsed, or a system administrator manually sends a request, the central agent distributes a capture agent to endpoints 14 and 16 and/or remote device 22. The capture agent collects media packets transmitted and received by endpoints 14 and 16 and stores the packets in a capture file. When the video conference ends or a timer started by the central agent expires, the capture agent communicates the capture file back to the central agent for analysis. The central agent decodes and analyzes the media packets, and displays the results on client device 20 for a system administrator. If the central agent determines that the latency, jitter, throughput, packet loss, or other relevant network parameters associated with the video conference exceed thresholds defined by the system administrator, an alarm may also be sent to the administrator.

As shown at step 40, a video conference may be established between endpoint 14a and endpoint 16b over network 12. Although a video conference between endpoints 14a and 16b will be described in detailed, it should be understood that a video conference could occur between any one or more of endpoints 14 and any one or more of endpoints 16. In an alternative embodiment, the same principles described below may also be applied to a telephone conference occurring between telephony devices coupled to network 12. At step 42, a central agent located at central device 18 monitors network 12 for potential problems. In one embodiment, the central agent is notified of a possible error by an alarm. The alarm indicates that a network parameter, such as an SNMP value in a router, has exceeded and/or dropped below a predetermined threshold. In another embodiment, notification of an error may be provided by a user at one of endpoints 14a and 16b. The user may use a telephone or send an electronic message over network 12 to the system administrator at client device 20. The system administrator may manually initiate the monitoring of jitter, latency, throughput, packet loss and/or other relevant network parameters for the video conference associated with the user. In a further embodiment, the central agent may distribute the capture agent automatically according to a time interval designated by the administrator.

If the central agent does not receive a request to monitor network 12 in order to measure the relevant network parameters in a video conference, the central agent continues to monitor network 12 with standard network management tools, such as SNMP tools, at step 42. If the central agent does receive a request to monitor network 12, either by a network alarm, an instruction from the system administrator, or according to a predefined time interval, the central agent distributes a capture agent to one or both collision domains that contain endpoints 14a and 16b at step 44. Once the capture agent is distributed to the collision domains, it may be executed on either or both of endpoints 14a and 16b, or remote device 22 may host the capture agent in the collision domain associated with endpoint 16b. In the illustrated embodiment, remote device 22 is located in the collision domain that contains endpoint 16b and may monitor any network traffic transmitted or received by endpoint 16b. In an alternative embodiment, remote device 22 may be located on a switch port on switch 24b that has the capability to monitor any traffic communicated to and/or from endpoint 16b.

When the capture agent is being distributed to endpoints 14a and 16b and/or remote device 22, the central agent starts a timer that is associated with the video conference at step 46. In one embodiment, the timer may be set to expire when the video conference ends. In an alternative embodiment, the timer may be set to expire after a predetermined amount of time has elapsed. In this example, if the video conference ends before the timer expires, the default for the timer is the end of the video conference. In a further embodiment, the timer may be set to collect a predetermined number of media packets. If the minimum amount of media packets is not collected, the capture agent attempts to generate results from the media packets that were collected during the length of the video conference.

After the timer is started, the distributed capture agents collect media packets that are transmitted and received by endpoints 14a and 16b at step 48. The media packets may include audio, video and/or data information. In one embodiment, network 12 may support communication using the RTP and RTCP, or any suitable protocol for transporting real-time data, such as audio or video, over network 20. RTP provides end-to-end delivery services for packets of media. In this example, the media packets include time stamps based on the time that the media packets were transmitted from one of endpoints 14a or 16b and sequence numbers that indicate the sequence in which the media packets should be assembled at the receiving endpoint. At step 50, the capture agent stores the collected media packets in a capture file that is located on a storage medium associated with either remote device 22 or endpoints 14a or 16b.

At step 52, the capture agent determines if the timer has expired. If the timer has not expired, the capture agent continues to collect media packets at step 48 and store the media packets in the capture file at step 50. If the timer has expired, the capture agent communicates the capture file containing the collected media packets to the central agent located on central device 18 at step 54. Upon receiving the capture file, the central agent decodes the media packets and calculates network parameters, such as latency, jitter, throughput packet loss, or other relevant network parameters, for network 12 during the video conference at step 56. In one embodiment, the central agent displays the calculated network parameters on a display coupled to central client 20 for the system administrator. In another embodiment, the central agent alerts the administrator when a value for jitter, latency, throughput, packet loss, and/or other relevant network parameters exceeds a predefined threshold by using an alarm. The system administrator may use the results or alarm to determine if the poor video and audio quality is caused by the network and troubleshoot the problems in real-time rather than having to travel to the physical location of either of endpoints 14a or 16b. In an alternative embodiment, the capture agent may perform the analysis of the media packets and communicate the results to the central agent for display on central device 20.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for identifying errors in a video conference conducted on a packet-based network, comprising:
   receiving a request to monitor the network during the video conference conducted between two or more endpoints;
   distributing a capture agent over a network from a central agent at a central device to a remote device in response to the request, the remote device associated with a collision domain that contains one of the two or more endpoints and operable to execute the capture agent;
   collecting a plurality of media packets associated with the video conference in a capture file until a timer expires, the capture file located in a storage medium interfaced with the remote device; and
   communicating the capture file from the remote device to the central device when the timer expires.

2. The method of claim 1, further comprising analyzing the media packets at the central device to determine one or more network parameters that caused an error in the video conference.

3. The method of claim 2, further comprising the network parameters selected from the group consisting of latency, jitter, throughput, and packet loss.

4. The method of claim 1, wherein the timer expires at the end of the video conference.

5. The method of claim 1, further comprising the remote device located on a switch port associated with the collision domain, the switch port operable to monitor network traffic between the two or more endpoints within the collision domain.

6. The method of claim 1, further comprising:
   distributing the agent from the central device to two or more remote devices respectively associated with the two or more endpoints, the two or more remote devices respectively located in two or more broadcast domains; and
   storing the media packets in two or more storage mediums respectively interfaced with the two or more remote devices until the timer expires.

7. The method of claim 1, wherein the media packets comprise real time protocol (RTP) packets and real time control protocol (RTCP) packets.

8. The method of claim 1, wherein the network comprises an Internet Protocol (IP) network, an Asynchronous Transfer Mode (ATM) network or a Frame Relay network.

9. The method of claim 1, wherein the media packets comprise audio information.

10. The method of claim 1, wherein the media packets comprise video information.

11. The method of claim 1, wherein the media packets comprise data information.

12. The method of claim 1, wherein receiving the request comprises receiving notification of a potential error in the network through an alarm generated by the central agent.

13. The method of claim 1, wherein receiving the request comprises determining that a distribute timer has expired.

14. The method of claim 1, wherein receiving the request comprises initiating the distribution of the capture agent by a system administrator at the central device.

15. An apparatus for identifying errors in a video conference conducted on a packet-based network, comprising:
   an interface operable to couple to the network;
   a storage medium; and
   a processing resource coupled to the storage medium and the interface, the processing resource operable to execute a capture agent received over the network from a central agent located at a central device and operable to:
   collect a plurality of media packets associated with the video conference conducted on the network between two or more endpoints in response to a request to monitor the network, the request received by the central agent;
   store the media packets in the storage medium until a timer expires; and
   communicate the media packets to the central device via the interface when timer expires.

16. The apparatus of claim 15, further comprising the capture agent operable to analyze the media packets to determine one or more network parameters that caused an error during the video conference.

17. The apparatus of claim 16, further comprising the network parameters selected from the group consisting of latency, jitter, throughput, and packet loss.

18. The apparatus of claim 15, wherein the media packets comprise audio information.

19. The apparatus of claim 15, wherein the media packets comprise video information.

20. The apparatus of claim 15, wherein the media packets comprise data information.

21. The apparatus of claim 15, wherein the media packets comprise real time protocol (RTP) packets and real time control protocol (RTCP) packets.

22. The apparatus of claim 15, wherein the timer expires after a predetermined amount of time, the predetermined amount of time calculated by the central device.

23. The apparatus of claim 15, wherein the network comprises an Internet Protocol (IP) network, an Asynchronous Transfer Mode (ATM) network or a Frame Relay network.

24. The apparatus of claim 15, wherein the capture agent collects media packets in response to an alarm received by the central agent that indicates a potential error on the network.

25. A system for identifying errors in a video conference conducted on a packet-based network, comprising:
- a first endpoint operable to couple to the network and conduct the video conference, the first endpoint located in a first collision domain;
- a second endpoint operable to couple to the network and conduct the video conference, the second endpoint located in a second collision domain;
- a central device operable to couple to the network and distribute over the network a capture agent to a first remote device associated with the first collision domain and a second remote device associated with the second collision domain in response to receiving a request to monitor the network during the video conference, each remote device operable to execute the capture agent, the capture agent operable to:
- collect a plurality of media packets associated with the video conference;
- store the media packets in a first storage medium interfaced with the first remote device and a second storage medium interfaced with the second remote device until a timer expires; and
- communicate the media packets from the first and second storage mediums to the central device when the timer expires.

26. The system of claim 25, wherein the central device comprises a central agent operable to analyze the media packets at the central device to determine one or more network parameters that caused an error in the video conference.

27. The system of claim 26, further comprising the network parameters selected from the group consisting of latency, jitter, throughput, and packet loss.

28. The system of claim 26, further comprising the request received via an alarm generated by the central agent at the central device, the alarm indicating a potential error on the network.

29. The system of claim 25, wherein the media packets comprise real time protocol (RTP) packets and real time control protocol (RTCP) packets.

30. The system of claim 25, wherein the media packets comprise audio information.

31. The system of claim 25, wherein the media packets comprise video information.

32. The system of claim 25, wherein the media packets comprise data information.

33. The system of claim 25, further comprising the request received from a system administrator at the central device in response to a call from a user at either one of the first or second endpoints.

34. The system of claim 25, further comprising the request received when a distribute timer expires.

35. The system of claim 25, wherein the timer expires after the capture agent collects a predetermined number of media packets.

36. The system of claim 25, further comprising:
- the first remote device located on a first switch port associated with the first collision domain, the first switch port operable to monitor network traffic between the two or more endpoints within the first collision domain; and
- the second remote device located on a second switch port associated with the second collision domain, the second switch port operable to monitor network traffic between the two or more endpoints within the second collision domain.

37. A method for identifying errors in a video conference conducted on a packet-based network, comprising:
- receiving a request to monitor the network during the video conference between two or more endpoints;
- distributing a capture agent over the network from a central device to each of the two or more endpoints in response to the request, the capture agent operable to collect a plurality of media packets transmitted and received by the two or more endpoints during the video conference;
- storing the media packets in storage mediums interfaced with each of the two or more endpoints until the end of video conference;
- communicating the media packets from each of the storage mediums to the central device when the video conference ends; and
- analyzing the media packets at the central device to determine one or more network parameters that caused the error.

38. The method of claim 37, further comprising the network parameters selected from the group consisting of latency, jitter, throughput, and packet loss.

39. The method of claim 37, wherein the media packets comprise real time protocol (RTP) packets and real time control protocol (RTCP) packets.

40. The method of claim 37, wherein the media packets comprise audio information.

41. The method of claim 37, wherein the media packets comprise video information.

42. The method of claim 37, wherein receiving the request comprises receiving notification of a potential error on the network through an alarm generated by a central agent located at the central device.

43. A system for identifying errors in a video conference conducted on a packet-based network, comprising:
- means for receiving a request to monitor the network during the video conference conducted between two or more endpoints;
- means for distributing a capture agent over a network from a central agent at a central device to a remote device in response to the request, the remote device associated with a collision domain that contains one of the two or more endpoints and operable to execute the capture agent;
- means for collecting a plurality of media packets associated with the video conference in a capture file until a timer expires, the capture file located in a storage medium interfaced with the remote device; and
- means for communicating the capture file from the remote device to the central device when the timer expires.

* * * * *